United States Patent Office 2,699,998
Patented Jan. 18, 1955

2,699,998

METHOD OF TREATING WASTE SULFITE LIQUORS

Avery A. Morton, Watertown, Mass., assignor to Penobscot Chemical Fibre Company, Boston, Mass., a corporation of Maine No Drawing. Application January 7, 1948, Serial No. 1,064

3 Claims. (Cl. 106—123)

This invention relates to a treatment for the concentration and fractionation of waste liquors from the manufacture of pulp and paper, and more especially from the sulfite process.

In the manufacture of pulp and paper an outstanding characteristic of the operations involved is the large proportion of water employed, with respect to the raw fibrous material treated and the refined fiber or pulp produced, and the consequently large proportionate volumes and ultimate amounts of waste liquor, which present a serious problem of suitable disposal.

Many proposals have been made to overcome this problem, such as the concentration of the liquors by evaporation or freezing of the liquid components, or by precipitation of the solid components. But of these, the former require excessive inputs or transfers of heat and energy and, moreover, involve very troublesome deposits of calcium salts, while the latter requires large amounts of reagent materials, which are usually lost in the sludge of precipitated materials or remain in solution in the liquid components and are discharged therewith.

It is now found, in accordance with the present invention, that recoveries of solids from such waste liquors may be made by effecting the segregation of the components through a different kind of procedure and treatment of the waste liquors.

It is now found that if such waste liquors are treated with a water-soluble organic liquid, such as an aliphatic alcohol, such organic liquid is effective preferentially to dissolve the aqueous component of the waste liquor and first to precipitate the troublesome calcium salts above mentioned. Further additions of such organic liquids tend to segregate and then to separate forming two liquid phases, one an aqueous-organic liquid fraction and the other an aqueous-solids fraction. If such organic liquids are characterized by low solvent capacity toward the solids components of the waste sulfite liquor, then at successively increasing degrees of concentration of such water-soluble organic liquid, progressively increasing degrees of insolubility of the several solids components of the waste liquor are reached. Segregation therefore takes place progressively, until at high concentrations of the organic liquid, the remaining aqueous-solids phase or fraction is comparatively small in volume and contains all or substantially all of the original solids components of the waste liquor. The aqueous-organic liquid phase, or fraction, on the other hand, is composed substantially entirely of the organic liquid and water, in mutual solution. Moreover, since the solids of the residual aqueous-solids component are of low solubility or substantially insoluble in the thus concentrated aqueous-organic liquid fraction, the two fractions become substantially mutually exclusive and immiscible, and therefore readily and completely separable. The aqueous-organic liquid component, if chosen of a lower specific gravity than water, will rise to the top as a supernatant, readily separable layer. But water-soluble organic liquids which are heavier than water or the sulfite liquor may be employed.

The segregative action thus observed is progressive with reference to increasing additions or proportions of the organic liquid to the waste liquor. Obviously with additions of very small proportions of the organic liquid to the waste liquor, the aqueous phase of the aqueous-solids fraction persists and the additions thus made merely dissolve therein. With increasing proportions and consequently increasing concentrations of the organic liquid relative to the aqueous-solids content, however, the influence of the increasing concentration of the organic liquid ultimately becomes dominant and may be regarded as the effective and selective solvent of the water, in the charge as a whole, and hence as the predominant solvent vehicle. The aqueous-solids fraction becomes more concentrated with respect to its solids content and may be regarded therefore as progressively dehydrated by the organic liquid. In other words, this aqueous-solids fraction is concentrated in respect of its solids contents up to and even after the point at which it becomes immiscible with and segregates and separates by gravity from the aqueous and organic liquid fraction.

Thus, for example, in the treatment of waste liquors from the sulfite process of making pulp and paper, which contain considerable quantities of bisulfite of calcium or of calcium and magnesium, the progressive addition of a water-soluble organic liquid, such as the aliphatic alcohols, presents a preliminary stage at which the troublesome deposit forming calcium salts become less and less soluble in the alcohol and water as a solvent and are then substantially precipitated out of solution. They may therefore be selectively removed by filtration, segregation or like separation from the remainder of the charge under treatment.

With further progressive additions of the water-soluble organic liquid—such as, more especially, the higher aliphatic alcohols—to the remainder of the charge (with or without preliminary removal of the precipitated calcium compounds) the solubility of the aqueous-solids components of the original waste liquor in the aqueous-alcohol solution becomes less and less (and conversely the solubility of the alcohol in the concentrated aqueous solution of solids becomes less and less) until they become mutually immiscible and there is a segregation of the two fractions as two separate liquid layers, or liquid phases. The aqueous-alcohol fraction and the aqueous-solids fraction thus become mutually insoluble and immiscible in each other.

There is undoubtedly a tendency for a partition of the several ingredients of the original waste liquor to take place between these two segregating fractions in terms of their respective solubilities therein. But they coexist as two, mutually immiscible and insoluble liquid phases.

The inorganic salts, such as the alkaline earth metal bisulfites, the dissolved organic salts, such as the alkaline earth metal lignin-sulphonates, the sugars, resins and cellulosic compounds are all relatively insoluble or of lowered solubility in the dominant concentrated water-organic liquid or water-alcohol solution. They therefore segregate but they tend to retain some of the water in which they are dissolved. Moreover they (and their aqueous solutions) are all of greater specific gravity than the aqueous-alcohol fraction, which becomes of lower specific gravity with increasing concentration. Consequently the aqueous-solids components sink to the bottom and the aqueous alcohol rises. and the two fractions constitute two separate immiscible, but fluid layers, the lower an aqueous-solids layer and the upper a clear, supernatant, aqueous-alcohol solution layer. But if an organic solvent of greater specific gravity, such as furfuryl alcohol (sp. gr. 1.12) is used, the aqueous-alcohol solution could form the bottom layer and the aqueous-solids fraction the top layer, depending, of course, upon the concentrations and relative specific gravities of each, in any given case.

The partition of water between the two layers and consequently the sharpness of separation and degree of immiscibility of the two layers will be directly controlled and regulated by the proportionate amount of alcohol added. In high proportions of alcohol, for example, nearly all of the water will be dissolved by the alcohol and extracted from the aqueous-solids fractions, so that the latter will be relatively low in volume, concentrated in respect of its dissolved and insoluble matter, of high specific gravity, and sharper separability accordingly from the rest of the treated charge. The aqueous-alcohol layer will be of large volume, high concentration, low specific gravity and substantially free from dissolved solids from the original waste liquor treated, since the solubility of such solids becomes less and less with increasing concentrations of the alcohol relative to the water therein.

The two segregated, immiscible fractions may therefore be readily and completely separated from each other by settling, centrifuging or the like. The aqueous-alcohol fraction may then be concentrated in respect of its alcohol content for re-use in the process in known ways, as by fractionating off the alcohol by distillation, and re-use of the aqueous fraction as make-up water in the process. The aqueous-solids fraction may be disposed of as a waste product of low bulk and mass, or utilized in various ways, e. g., as a material for fermentation and growth of molds, by calcining for recovery of the alkaline earth metal salts, direct use in briquets, and the like. Any alcohol content therein or entrained with the aqueous-solids fraction may be recovered or will be very slight in amount and concentration or may serve an effective purpose for various applications, such as to preserve an open structure, upon evaporation, calcining or burning the residual sludge.

In practice the proportions and hence the ultimate amount of water soluble organic liquid to be added to any given waste liquor will be determined in terms of the concentration and total water content of the waste liquor, and the desired concentration of the resulting aqueous-alcohol fraction to be segregated; and also with regard to the amount and solubility characteristics of the solid matter in the aqueous-solids fraction toward the aqueous-alcohol fraction at such concentration.

In some instances, for example, it may be regarded as sufficient to add a relatively small proportion of water-soluble organic liquid, such as the alcohol, thereby precipitating the troublesome, deposit-forming alkaline earth metal salts, and then, with or without the removal of the precipitate, adding more of the water-soluble organic liquid, or higher aliphatic alcohol, to the point of segregation and formation of immiscible layers, separating the upper aqueous-alcohol fraction, and sending the lower aqueous-solids fraction and precipitated alkaline earth metal salts to further recovery. This may be effected by filtration of the alkaline earth metal or other insoluble compounds, if present, and subjecting the remainder or filtrate, to further treatment or treatments with alcohol and again segregating the aqueous-alcohol and aqueous-solids fractions from each other.

On the other hand, the alcohol treatment of the waste liquor may be continuously advanced (that is, without separation of the preliminary precipitate of troublesome calcium salts) so as to produce a sufficient concentration in respect of the aqueous-alcohol fraction to effect the proportionate degree of segregation and separation (and concentration) from the aqueous-solids fraction which is desired, and the two fractions may then be separated. The aqueous-alcohol fraction will be subjected to distillation or the like, for recovery and re-use of the alcohol, while the aqueous-solids fraction then containing substantially all of the solid matter of the original waste sulfite liquor, both soluble and insoluble (and including the troublesome calcium compounds), may be submitted to further successive treatments for the fractionating, segregation and recovery of other values therein, as desired.

The segregated lower layer, owing to the precipitation of solids therein, to its greater specific gravity, to the increased concentration of dissolved solids therein, and to the consequent increased insolubility of the added alcohol (at progressively greater concentrations) therein, ultimately contains by far the larger part or substantially all of the solids components of the original waste liquor, whether dissolved or dispersed, and in an almost alcohol-free aqueous medium.

Accordingly, by separation of the supernatant, clear aqueous-alcohol fraction from the bottom aqueous-solids fraction, nearly all of the alcohol which has been added may be separated and recovered by distillation (from the water component of the waste liquor by which it is diluted) uncontaminated with other materials either dissolved or in suspension therein. The aqueous residue from such distillation may contain some soluble solids. If so, these may be recovered if it is deemed economically advisable to do so.

The lower aqueous-solids layer, either containing the troublesome calcium salts of the waste liquor or substantially freed from them by the preliminary segregation and separation described above, may then be used in the usual ways, as for shaping briquets, as a fuel, or for further separation and recovery of its several components.

For some purposes it may be desirable or convenient to mix the added alcohol and waste liquor intimately with each other, as added, and thus effect a more rapid and more complete admixture and solution of the one in the other. This may be advantageously done when only a small amount of the alcohol is added, to effect a preliminary precipitation and separation of the less soluble calcium salts, followed by filtration of the same, and also in subsequent treatment of the filtrate with further additions of alcohol and more complete segregation and quicker separation of the aqueous-solids components.

On the other hand it is perfectly feasible merely to add the alcohol by introducing the same into the upper portion (or lower portion) of a quiescent charge of waste liquor, and let the same dissolve by diffusion throughout the charge.

As some of the water-soluble organic liquids mentioned above, methyl, ethyl and isopropyl alcohol and tertiary butyl alcohol, normal propyl, secondary butyl, tertiary amyl alcohol, allyl, furfuryl, tetrahydrofurfuryl alcohols, "Cellosolve," "Butyl Cellosolve," pentanediol, 1-2, 1-4, and 1-5 alcohols, acetone, acetonyl acetone, and methylethyl ketone, caproic acids, pyridine and like infinitely water-soluble organic liquids, or partially water-soluble liquids may also be used.

Of the alcohols, it may be said that methyl and ethyl alcohols, while infinitely soluble in water, form solutions in water which will effect the preliminary precipitation of troublesome calcium salts. But they will also continue to dissolve (though in decreasing degree with increasing concentration) the other solid components of the waste sulfite liquor. Hence their addition does not readily form a solution which is immiscible with the aqueous-solids fraction. It is therefore in general necessary to effect merely the preliminary precipitation of calcium salts or a less complete segregation between the two layers, or to use large proportions of these alcohols. (Methyl "Cellosolve" and pyridine also fall in this category.) The higher alcohols, containing three or more carbon atoms in the molecule, on the other hand, even though they may be infinitely soluble or only partially soluble in water, manifest a much lower solvent capacity for the components of the waste sulfite liquor. Hence they are effective in smaller proportions, either per se or in appropriate mixtures of them, and tend to produce more sharply segregated and separated fractions, and to retain (in solution) much smaller amounts of the solids components from the separated aqueous-solids layer than methyl and ethyl alcohol. Alcohols or solvents of very high miscibility such as methyl and ethyl are, however, used to better advantage with aqueous solutions which are more concentrated than those commonly obtained from the sulfite digester. This concentration can conveniently be made by use of the higher molecular weight alcohols.

Pyridine and other water soluble amines can be used provided attention is given to the chemical reactions that may also occur. Such bases will, of course, form salts with the acids that are present and the resulting salts may have a high solubility in the aqueous pyridine solution. Such solvents can be used, however, since any such solvent can be altered by the addition of a less soluble one of its class until the desired proportioning is achieved. For example in the use of pyridine, the addition of some aniline, which is soluble in water only to a small extent, causes the separation into two layers, at times when pyridine alone is ineffective.

In a typical example of the practical application of the invention, the waste sulfite liquor as it comes from the digester is cooled to a working temperature (to avoid subsequent loss of added organic solvent by evaporation) and treated with a volume and a half of t-butyl alcohol. Two layers separate at once and an insoluble precipitate settles more slowly. Within ten minutes the upper layer can be withdrawn and this portion then treated separately to recover any solids which may be contained in that fraction. This recovery can be effected in any of a number of ways, for example, by evaporating the organic solvent and then concentrating the remaining aqueous residue. The solids obtained therefrom will have a different, usually higher, proportion of sugars than will the solids originally present in the sulfite liquor. The lower layer may be filtered to remove the insoluble and troublesome calcium salt. The filtrate is then evaporated to recover a small amount of alcohol and to concentrate the solids therein. The dried solids from this fraction contained 54% of the solids originally present in the sulfite liquor and had a high proportion of the water-soluble calcium salts.

As an illustration of the use of two solvents in several stages, 100 volumes of sulfite liquor were treated with 100 volumes of t-amyl alcohol and 41 volumes of isopropyl alcohol. Two liquid layers segregated, and separated from each other, the lower one having a total of 69 volumes and most of the solids. This lower layer, after being separated from the upper layer, and filtered to remove insoluble matter, was treated with 53 volumes of t-amyl alcohol and 17 volumes of isopropyl alcohol, whereupon two liquid layers were again segregated, of which the lower layer amounted to 40 volumes. This portion was in turn separated from the upper layer and treated with 30 volumes of t-amyl alcohol and 11.5 volumes of isopropyl alcohol with a further reduction in volume of the resulting segregating lower layer to 26.2 volumes. This portion was separated and then treated with 19 volumes of t-amyl alcohol and 6 volumes of isopropyl alcohol to give a further segregation, the amount of the final lower layer being 23 volumes. This final portion was a viscous liquid that contained 89.3% of the total solids. In all, 202 volumes of t-amyl alcohol and 75 volumes of isopropyl had been used with 100 volumes of sulfite liquor. The final concentrate can be dried readily by heat.

Similar procedures, conducted with other water-soluble organic solvents and mixtures thereof in various proportions, gave results, upon sulfite waste liquors containing about 12.5% of solid matter, as indicated in the following tables:

*Table I*

[Separation of phases and concentration of solids by addition of 233 volumes of solvent to 100 volumes of sulfite liquor.]

| Solvent | Solids separated in lower layer, percent | Volume of lower layer, wt. |
|---|---|---|
| Methyl alcohol | | Solids only. |
| Ethyl alcohol | 1.5 | 4. |
| Isopropyl alcohol | 89 | 10. |
| t-Butyl alcohol | 63 | 16. |
| Methyl "Cellosolve" | | Solids only. |
| Butyl "Cellosolve" | | 18. |
| Acetone | 74 | 11. |
| Pyridine | | Solids only. |

Table II shows the effect of variation of the quantity of t-butyl alcohol relative to the volume of waste liquor treated. In each of these cases the insoluble and troublesome calcium salt was separated by filtration from the remainder of the product before the solids dissolved in the lower layer were measured.

*Table II*

[Effect of the quantity of t-butyl alcohol on the removal of water from sulfite liquor and the concentration of solids in the aqueous layer.]

| Solids present in the sulfite liquor | Volume of t-butyl alcohol per 100 volumes of sulfite liquor | Volume of lower layer | Solids in lower layer; Percent of original solids |
|---|---|---|---|
| 12.5 | 90 | 12 | 29 |
| 12.5 | 124 | 18.4 | 33 |
| 11.0 | 150 | 18.8 | 54 |
| 11.0 | 233 | 18.3 | 65 |
| 11.0 | 300 | 14 | 44 |

*Table III*

[Removal of water from sulfite liquor and concentration of solids by addition of organic solvents. Effect of addition of partially miscible solvents.]

| Sulfite Liquor | Volume percentage of Completely Miscible Solvents [a] | | | | Partially Miscible Solvents [b] | | Lower Layer,[c] Percent | Solids in Lower Layer,[d] Percent |
|---|---|---|---|---|---|---|---|---|
| | Et. | Is. | t-Bu | Ac. | t-Am. | MeEt.K. | | |
| 30 | | 70 | | | 10 | | 8.3 | 45 |
| 30 | | 60 | | | | | 9.5 | 49 |
| 30 | | 30 | | | 40 | | 19 | 68 |
| 40 | | 60 | | | | | 7.9 | 11 |
| 40 | | 50 | | | 10 | | 10 | 44 |
| 40 | | 40 | | | 20 | | 16 | 51 |
| 40 | | 20 | | | 40 | | 59 | 87 |
| 40 | | 15 | | | 45 | | 61 | 93 |
| 50 | | 30 | | | 20 | | 20 | 40 |
| 50 | | 20 | | | 30 | | 68 | 85 |
| 20 | | 70 | | | 10 | | 30 | 81 |
| 20 | | 20 | | | 60 | | 15 | 70 |
| 30 | | | 70 | | | | 18 | 65 |
| 30 | | | 60 | | 10 | | 16 | 68 |
| 30 | | | 40 | | 30 | | 33 | 82 |
| 40 | | | 50 | | 10 | | 29 | 69 |
| 40 | | | 40 | | 20 | | 38 | 78 |
| 40 | | | 30 | | 30 | | 59 | 89 |
| 50 | | | 40 | | 10 | | 42 | 63 |
| 30 | 60 | | | | 10 | | 6 | 39 |
| 30 | | | | 60 | | 10 | 12 | 55 |

[a] Et.=ethyl alcohol, Is.=isopropyl alcohol, t-Bu.=t-butyl alcohol, Ac.=acetone.
[b] t-Am.=t-amyl alcohol, MeEt.K.=methyl ethyl ketone.
[c] Percentage of the original volume of sulfite liquor.
[d] Percentage of the total solids segregated in the lower layer.

The use of liquid carboxylic acids has been demonstrated by experiments with mixtures of caproic acid and acetic acid, the former being only slightly soluble in water and therefore unsuitable by itself and the latter being so soluble that separation into two layers does not occur at the concentration of sulfite liquor ordinarily obtained from the digester. A mixture of the two does, however, cause the separation into two layers. For example, 173 volumes of sulfite liquor that contained 13% of solids was treated with a mixture of 146 volumes of acetic acid and 147 volumes of caproic acid. The lower layer that settled contained 17 volumes in which was suspended the small amount of troublesome calcium salt. After filtration to remove this material the lower layer was extracted with benzene to remove traces of the carboxylic acid still remaining. Removal of the water by evaporation on a steam bath showed that 22% of the total solids originally present had been removed.

It may be observed with reference to the use of mixtures of water-soluble organic liquids, as indicated in the above Table III, that the resulting mixture of such liquids may be so chosen as to present an enhanced degree of solubility of the resulting mixture in water, as compared to the solubility of one or more of them alone, and also a lowered solvent capacity toward the several components of the waste sulfite liquor in such mixtures, than with respect to one or more of the organic liquids, if used per se.

In the foregoing examples the amount of solids separated in the lower layer have varied over a wide range, some being as high as 85 to 93% and others being as low as 11, 22 or 39%. This wide range has been obtained by changes in the proportions of solvent, the kind of solvents, and the particular mixture of solvents added and results from varying degrees of selectivity for the several types of solids present. Therefore a fractionation is effected which can be varied widely by appropriate choice of conditions and solvent.

Thus ethyl and methyl alcohol are more soluble in water than some of the higher aliphatic alcohols containing more than three carbon atoms in the molecule which are not infinitely soluble in water. Moreover, some of the solids in the waste sulfite liquor which are of appreciable solubility in methyl or ethyl alcohol (especially when the latter are of lower concentrations in water) such as the carbohydrates and sugars, are much less soluble in alcohols containing three carbon atoms or more in the molecule. Hence additions of such alcohols depress the solubility of the soluble components of the aqueous-solids fraction, in the lower alcohol fractions, even while the latter are less concentrated with respect to the alcohol phase than would otherwise be necessary with the lower alcohol per se. This is similarly true of mixtures of other organic liquids which are of lower solubility in water and/or lower solvent capacities for the solids components of the waste liquor, per se, but effective when used in such mixtures.

It should be understood that the present disclosure is for the purpose of illustration only and that this invention includes all modifications and equivalents which fall within the scope of the appended claims.

I claim:

1. Method of treating calcium sulfite liquors from pulp and paper manufacture comprising the preliminary step of adding a water-soluble aliphatic alcohol, in which the solid components of the sulfite liquor are of low solubility, to the sulfite liquor, which is of substantially the same composition and condition in which the latter comes from the pulp treated therewith, whereby a portion of the calcium salts contained therein are segregated and thereupon adding an aliphatic alcohol containing three or more carbon atoms in its molecular structure, whereby the thus treated charge is segregated into an aqueous alcohol fraction and an aqueous-solids fraction, the latter containing the greater part of the solid and water-soluble matter of the original sulfite liquor.

2. Method of treating waste calcium sulfite liquors from pulp and paper manufacture comprising the steps of adding a water-soluble aliphatic alcohol, in which the solid components of the sulfite liquor are of low solubility, to the sulfite liquor, which is of substantially the same composition and condition in which the latter comes from the pulp treated therewith, whereby the relatively insoluble calcium salts of the sulfite liquor are separated, removing the insoluble calcium salts of the sulfite liquor therefrom and subsequently treating the remainder of the sulfite liquor with a water-soluble aliphatic alcohol whose molecule contains at least three carbon atoms, whereby the thus treated charge is segregated into an aqueous-alcohol fraction and an aqueous-solids fraction containing the greater part of the remaining solid matter in said remainder of the original sulfite liquor.

3. A method of fractionating waste calcium sulfite liquors from paper and pulp manufacture comprising treating the same with a water-soluble aliphatic alcohol, in which the solid components of the sulfite liquor are of low solubility, to the sulfite liquor, which is of substantially the same composition and condition in which the latter comes from the pulp treated therewith, whereby a portion of the alkaline earth metal salts therein are precipitated, removing the resulting precipitate and successively treating the remainder with an additional amount of water-soluble aliphatic alcohol, whose molecule contains at least three carbon atoms, and separating the aqueous-alcohol fraction from the aqueous-solids fraction of the resulting mixture.

References Cited in the file of this patent

UNITED STATES PATENTS

| | | |
|---|---|---|
| 1,560,900 | Drewsen | Nov. 10, 1925 |
| 1,936,250 | Limburg | Nov. 21, 1933 |
| 1,977,728 | Leach | Oct. 23, 1934 |
| 2,037,001 | Aronovsky | Apr. 14, 1936 |
| 2,104,701 | Sandborn | Jan. 4, 1938 |
| 2,291,824 | Miller | Aug. 4, 1942 |
| 2,380,448 | Katzen | July 31, 1945 |
| 2,401,373 | Robinson et al. | June 4, 1946 |
| 2,405,451 | Salvesen et al. | Aug. 6, 1946 |

FOREIGN PATENTS

| | | |
|---|---|---|
| 17,956 | Great Britain | 1908 |
| 443,967 | Great Britain | Mar. 4, 1936 |
| 242,170 | Switzerland | Apr. 30, 1946 |

OTHER REFERENCES

Chem. and Eng. News, v. 23, N. 12, June 25, 1945, page 1076.